United States Patent
Tarashima et al.

(10) Patent No.: US 11,594,009 B2
(45) Date of Patent: Feb. 28, 2023

(54) OBJECT DETECTION DEVICE, METHOD, AND PROGRAM

(71) Applicant: NIPPON TELEGRAPH AND TELEPHONE CORPORATION, Tokyo (JP)

(72) Inventors: Shuhei Tarashima, Tokyo (JP); Takashi Hosono, Tokyo (JP); Yukito Watanabe, Tokyo (JP); Jun Shimamura, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 17/251,172

(22) PCT Filed: May 7, 2019

(86) PCT No.: PCT/JP2019/018269
§ 371 (c)(1),
(2) Date: Dec. 10, 2020

(87) PCT Pub. No.: WO2019/239743
PCT Pub. Date: Dec. 19, 2019

(65) Prior Publication Data
US 2021/0209403 A1  Jul. 8, 2021

(30) Foreign Application Priority Data

Jun. 11, 2018 (JP) .............................. JP2018-110996

(51) Int. Cl.
*G06K 9/00* (2022.01)
*G06V 10/44* (2022.01)
(Continued)

(52) U.S. Cl.
CPC ....... *G06V 10/443* (2022.01); *G06K 9/00523* (2013.01); *G06K 9/6215* (2013.01); *G06V 10/25* (2022.01); *G06V 10/457* (2022.01)

(58) Field of Classification Search
None
See application file for complete search history.

(56) References Cited

U.S. PATENT DOCUMENTS

| | | | |
|---|---|---|---|
| 2011/0142286 A1* | 6/2011 | Morriyama | H04N 5/23218 382/103 |
| 2017/0060986 A1* | 3/2017 | Ideses | G06F 16/93 |
| 2018/0232603 A1* | 8/2018 | Shim | A61B 6/00 |

FOREIGN PATENT DOCUMENTS

JP    2010262578 A  * 11/2010

OTHER PUBLICATIONS

Rubinstein et al. (2013) "Unsupervised Joint Object Discovery and Segmentation in Internet Images", Proceedings / CVPR, IEEE Computer Society Conference on Computer Vision and Pattern Recognition. 1939-1946. 10.1109/CVPR.2013.253.

(Continued)

*Primary Examiner* — Soo Jin Park

(57) ABSTRACT

Even if an object to be detected is not remarkable in images, and the input includes images including regions that are not the object to be detected and have a common appearance on the images, a region indicating the object to be detected is accurately detected. A local feature extraction unit 20 extracts a local feature of a feature point from each image included in an input image set. An image-pair common pattern extraction unit 30 extracts, from each image pair selected from images included in the image set, a common pattern constituted by a set of feature point pairs that have similar local features extracted by the local feature extraction unit 20 in images constituting the image pair, the set of feature point pairs being geometrically similar to each other.

(Continued)

A region detection unit 50 detects, as a region indicating an object to be detected in each image included in the image set, a region that is based on a common pattern that is omnipresent in the image set, of common patterns extracted by the image-pair common pattern extraction unit 30.

8 Claims, 17 Drawing Sheets

(51) Int. Cl.
*G06K 9/62* (2022.01)
*G06V 10/25* (2022.01)

(56) References Cited

OTHER PUBLICATIONS

Tarashima et al., (2016) "Joint Object Discovery and Segmentation with Image-wise Reconstruction Error", in ICIP, 849-853. 10.1109/ICIP.2016.7532477.

* cited by examiner

OBJECT DETECTION DEVICE, METHOD, AND PROGRAM

CROSS-REFERENCE TO RELATED APPLICATIONS

This application is a U.S. 371 Application of International Patent Application No. PCT/JP2019/018269, filed on 7 May 2019, which application claims priority to and the benefit of JP Application No. 2018-110996, filed on 11 Jun. 2018, the disclosures of which are hereby incorporated herein by reference in their entireties.

TECHNICAL FIELD

The present invention relates to an object detection device, method, and program, and relates particularly to an object detection device, method, and program for specifying a position, in an image, of an object that appears in common in an image set.

BACKGROUND ART

To understand the situation in the real world and perform advanced analysis, it is very important to automatically detect an object such as a product or a logo that appears in an image or a video, or more specifically to grasp the type of the object and the position of the object in an image. If, for example, a specific product can be automatically detected in an image posted on an SNS, the situation where this product is used and a product that is purchased at the same time become apparent, which leads to realization of a more detailed marketing research. Also, if a company logo can be automatically detected in a television picture, the time at which the logo is displayed and the position at which the logo is displayed in the television screen are quantified, making it possible to measure promotion effects and flexibly set an advertisement rate, for example. Thus, object detection can be considered as an underlying technology with broad industrial applicability.

Many of the known object detection technologies are based on the premise that an object detector model is learnt from a large amount of labeled training data related to an object. Here, "label" refers to information indicating the type of an object that appears in each of the images, which are training data, and position information regarding the object in the images. Position information is, for example, information regarding coordinate positions at four corners of a rectangle that exactly surrounds a region indicating an object appearing in an image. Commonly, it takes a huge cost to manually construct such training data.

A technology for automatically detecting, to solve the above problem, an object appearing a plurality of image sets to which the same label is attached, while taking notice of the fact that it is relatively easy to only obtain a label indicating the type of the object appearing in an image, or such a label can be attached at low cost, is called "weakly supervised object detection".

In conventional weakly supervised object detection technologies, for example, there are many cases where a region indicating an object to be detected (hereinafter referred to as a "target object region") is specified by estimating a highly-remarkable region in each image, associating obtained regions with each other in an image set, and evaluating the ease of reconstruction thereof. For example, a method has been proposed in which, first, close association on a pixel basis is estimated in an image pair in which highly remarkable regions are similar to each other, and a target object region is specified based on an error that occurs when each pixel of each image is reconstructed with a similar image using the estimation results (e.g. see NPL 1).

In the technology proposed in NPL 1, close association needs to be calculated for many image pairs, which increases the processing cost. Taking notice of this point, a method has also been proposed in which a target object region is rapidly specified by evaluating the ease of reconstruction per feature value that is extracted from a highly remarkable region (e.g. NPL 2).

CITATION LIST

Non Patent Literature

NPL 1 M. Rubinstein et al., "Unsupervised Joint Object Discovery and Segmentation in Internet Images", in CVPR, 2013.

NPL 2 S. Tarashima et al., "Joint Object Discovery and Segmentation with Image-wise Reconstruction Error", in ICIP, 2016.

SUMMARY OF THE INVENTION

Technical Problem

However, the aforementioned conventional weakly supervised object detection technologies have roughly two problems below. The first point is that the hypothesis that "a target object region is highly remarkable", which is implicitly assumed in the conventional weakly supervised object detection technologies, does not hold in many cases.

For example, it is assumed that, as shown in FIG. 16, target object regions are rectangular regions (rectangular regions indicated by broken lines in FIG. 16) each of which exactly surrounds an "AA Life Insurance" logo displayed on a television screen. In this case, a remarkability map that is estimated using the conventional technologies is as shown in the right part of FIG. 16. Note that the right part of FIG. 16 shows an example of a remarkability map in which pixels included in a region with higher remarkability are shown with higher pixel values (brighter pixels), and pixels included in a region with lower remarkability are shown with lower pixel values (darker pixels). It can be understood that, in the example in FIG. 16, many of the regions other than the target object regions are estimated as regions with high remarkability, and a target object region is not estimated as a region with high remarkability.

This happens because, commonly, a region with high remarkability is defined as a region that meets conditions that a contrast difference of the region from surrounding regions is large, the region has a high saturation, and the region appears largely near the center of the image, whereas the target object regions do not meet these conditions. Accordingly, if an image set such as one shown in FIG. 16 is input, the target object regions cannot be accurately detected with the conventional technologies.

The second point is that the hypothesis that "no similar regions other than target object regions are included in an image pair in the input image set", which is also assumed in the conventional weakly supervised object detection technologies, does not hold in many cases.

For example, in an image pair shown in FIG. 17, the regions of "AA Life Insurance", which are the target object regions, are naturally similar to each other (in FIG. 17, regions indicated by solid-line ellipses that are connected by a solid-line arrow). However, it can be understood that, in addition to the target object regions, a large number of regions that have a common appearance on the images are included (for example, in FIG. 17, regions indicated by broken-line ellipses that are connected by broken-line arrows). Regions that have a common appearance on the images are readily associated with each other, and can also be, naturally, readily reconstructed with a similar image. Thus, in the conventional technologies, many of these "regions that are not a target object region but have a common appearance on the images" are also detected. Thus, with the conventional technologies, a target object region cannot be accurately detected.

Thus, the conventional weakly supervised object detection technologies have a problem in that, if the input includes an image in which the remarkability of a target object region is low and that includes regions that are other than the target object region and have a common appearance on the images, the target object region cannot be accurately detected.

The present invention has been made in view of the foregoing situation, and an objective of the invention is to provide an object detection device, method, and program that enables a region indicating an object to be detected to be accurately detected, even if the object to be detected is not remarkable in images, and the input includes images that include regions that are not the object to be detected and have a common appearance on the image.

Solution to Problem

To achieve the above-stated objective, an object detection device according to the present invention is configured to include: a local feature extraction unit for extracting a local feature of a feature point from each image included in an input image set; an image-pair common pattern extraction unit for extracting, from each image pair selected from images included in the image set, a common pattern configured by a set of feature point pairs that have similar local features extracted by the local feature extraction unit in images configuring the image pair, the set of feature point pairs being geometrically similar to each other; and a region detection unit for detecting, as a region indicating an object to be detected in each image included in the image set, a region that is based on a common pattern that is omnipresent in the image set, among common patterns extracted by the image-pair common pattern extraction unit.

With the object detection device according to the present invention, the local feature extraction unit extracts a local feature of a feature point from each image included in an input image set, and the image-pair common pattern extraction unit extracts, from each image pair selected from images included in the image set, a common pattern configured by a set of feature point pairs that have similar local features extracted by the local feature extraction unit in images configuring the image pair, the set of feature point pairs being geometrically similar to each other. Thus, a common pattern is extracted without making any assumption about the position, size, contrast, or the like of the region to be detected, and thus, even a region that does not meet a remarkability condition can be accurately extracted as a candidate region to be detected.

Also, the region detection unit detects, as a region indicating an object to be detected in each image included in the image set, a region that is based on a common pattern that is omnipresent in the image set, among the common patterns extracted by the image-pair common pattern extraction unit.

Thus, a common pattern that is not a target and may be included in a specific image pair in the input image set can be excluded from candidate regions to be detected.

That is to say, with the object detection device according to the present invention, even if an object to be detected is not remarkable in the images, and the input includes images including regions that are not the object to be detected and have a common appearance on the images, a region indicating the object to be detected can be accurately detected.

In the object detection device according to the present invention, the image-pair common pattern extraction unit can be configured to include: an image-pair selection unit for selecting an image pair from the image set; a provisional association unit for provisionally associating feature points that have similar local features extracted by the local feature extraction unit with each other as a feature point pair, in each image pair selected by the image-pair selection unit; a correspondence graph construction unit for using the feature point pair associated by the provisional association unit as a node, and constructing a correspondence graph in which nodes corresponding to feature point pairs that meet a condition indicating that these feature point pairs are geometrically consistent are connected to each other with an edge; a correspondence graph clustering unit for extracting a cluster of a node set corresponding to a feature point pair set that configures a same common pattern, from the correspondence graph constructed by the correspondence graph construction unit; and a cluster integration unit for extracting, as the common pattern, a region obtained by integrating regions on the images, the regions corresponding to the cluster extracted by the correspondence graph clustering unit, based on a degree of spatial overlapping between the regions.

In the object detection device according to the present invention, the correspondence graph construction unit can determine whether or not the condition indicating that the feature point pairs are geometrically consistent is met, using the local features of the feature points included in the feature point pair associated by the provisional association unit. The geometrical consistency can be appropriately determined by using the local features of feature points, specifically the positions and attributes (scale and orientation) of the feature points.

In the object detection device according to the present invention, the correspondence graph clustering unit extracts a cluster in which feature point pairs corresponding to all nodes included in the cluster are not configured by a common feature point. This configuration enables inappropriate feature point pairs to be excluded from the feature point pairs that configure a common pattern.

In the object detection device according to the present invention, the region detection unit can be configured to include: a common pattern graph construction unit for using each common pattern extracted by the image-pair common pattern extraction unit as a node, connecting, with an edge, nodes corresponding to a common pattern that is common within an image and between images included in the image set, and constructing a common pattern graph in which identification information regarding an image from which the common pattern is extracted is given to a corresponding node; an omnipresent common pattern selection unit for selecting, as an omnipresent common pattern, a common pattern corresponding to a path with a high degree of coverage of a set of the identification information regarding the image given to nodes included in the path, relative to a set of identification information regarding all images included in the image set, of paths included in the common pattern graph constructed by the common pattern graph construction unit; and an omnipresent common pattern integration unit for detecting, as a region indicating the object to be detected, a region obtained by integrating omnipresent common patterns selected by the omnipresent common pattern selection unit within each image based on at least one of commonality of paths corresponding to the omnipresent common patterns and a degree of spatial overlapping of the omnipresent common patterns in the image.

In the object detection device according to the present invention, the region detection unit can be configured to further include a detected region correction unit for correcting a boundary of a region indicating the omnipresent common pattern, based on information regarding pixels surrounding the region indicating the omnipresent common pattern. This configuration makes it possible to more appropriately detect a region to be detected.

An object detection method according to the present invention is a method including: extracting a local feature of a feature point from each image included in an input image set, by a local feature extraction unit; extracting, from each image pair selected from images included in the image set, a common pattern configured by a set of feature point pairs that have similar local features extracted by the local feature extraction unit in images configuring the image pair, the set of feature point pairs being geometrically similar to each other, by an image-pair common pattern extraction unit; and detecting, as a region indicating an object to be detected in each image included in the image set, a region that is based on a common pattern that is omnipresent in the image set, of common patterns extracted by the image-pair common pattern extraction unit, by a region detection unit.

An object detection program according to the present invention is a program for causing a computer to function as each unit that configures the above-described object detection device.

Effects of the Invention

As described above, with the object detection device, method, and program according to the present invention, even if an object to be detected is not remarkable in images, and the input includes images including regions that are not the object to be detected and have a common appearance on the images, a region indicating the object to be detected can be accurately detected.

DESCRIPTION OF EMBODIMENTS

Hereinafter, an example of a mode for carrying out the present invention will be described in detail with reference to the drawings.

Figure 1:
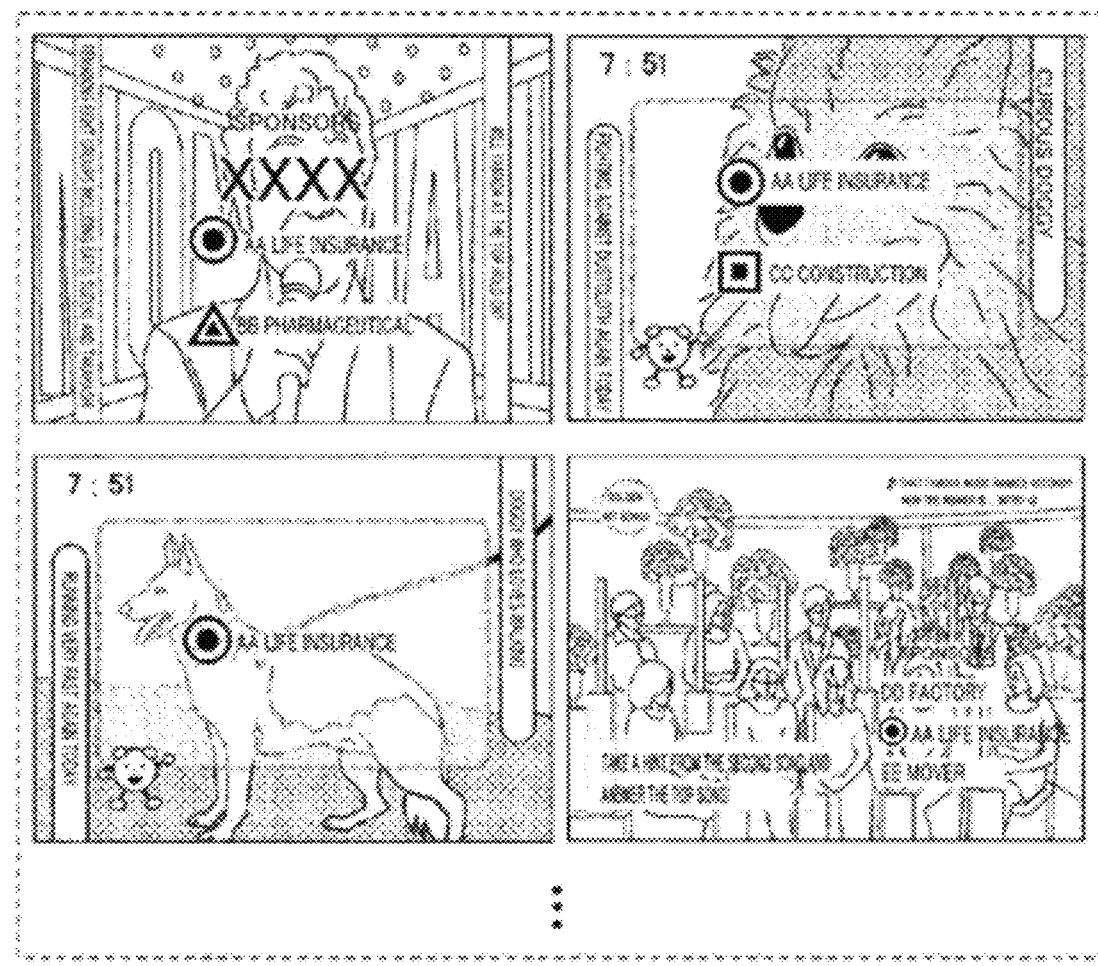
FIG. 1 is a diagram schematically showing an example of an image set.

An image set, to which labels each indicating the same object are attached, is input to an object detection device according to the present embodiment. FIG. 1 schematically shows an example of the image set that is input to the object detection device. The present embodiment will describe the case where an "AA Life Insurance" logo that is included in television pictures is a target object region. The "AA Life Insurance" label is attached to each of the images included in the input image set. Note that an image that actually does not include an object to be detected at all, that is, an image to which the "AA Life Insurance" label is not attached may also be mixed as a part of the input image set.

The object detection device detects a region corresponding to an object indicated by the label (a region of an "AA Life Insurance" logo) in each of the images included in the input image set, and outputs target object region information that indicates the position of the detected region.

The object detection device according to the present embodiment is configured as a computer that includes a CPU (Central Processing Unit), a RAM (Random Access Memory), a ROM (Read Only Memory), an HDD (Hard Disk Drive), and so on. An object detection program according to the present embodiment is stored in the ROM. Note that the object detection program may alternatively be stored in the HDD.

The object detection program may alternatively be installed, in advance, in the object detection device, for example. This object detection program may alternatively be realized by being stored in a nonvolatile storage medium or distributed via a network, and installed, as appropriate, in the object detection device. Note that examples of the nonvolatile storage medium may include a CD-ROM (Compact Disc Read Only Memory), a magneto-optical disk, a DVD-ROM (Digital Versatile Disc Read Only Memory), a flash memory, a memory card, and the like.

The CPU functions as later-described functional units of the object detection device by loading and executing the object detection program stored in the ROM.

Figure 2:
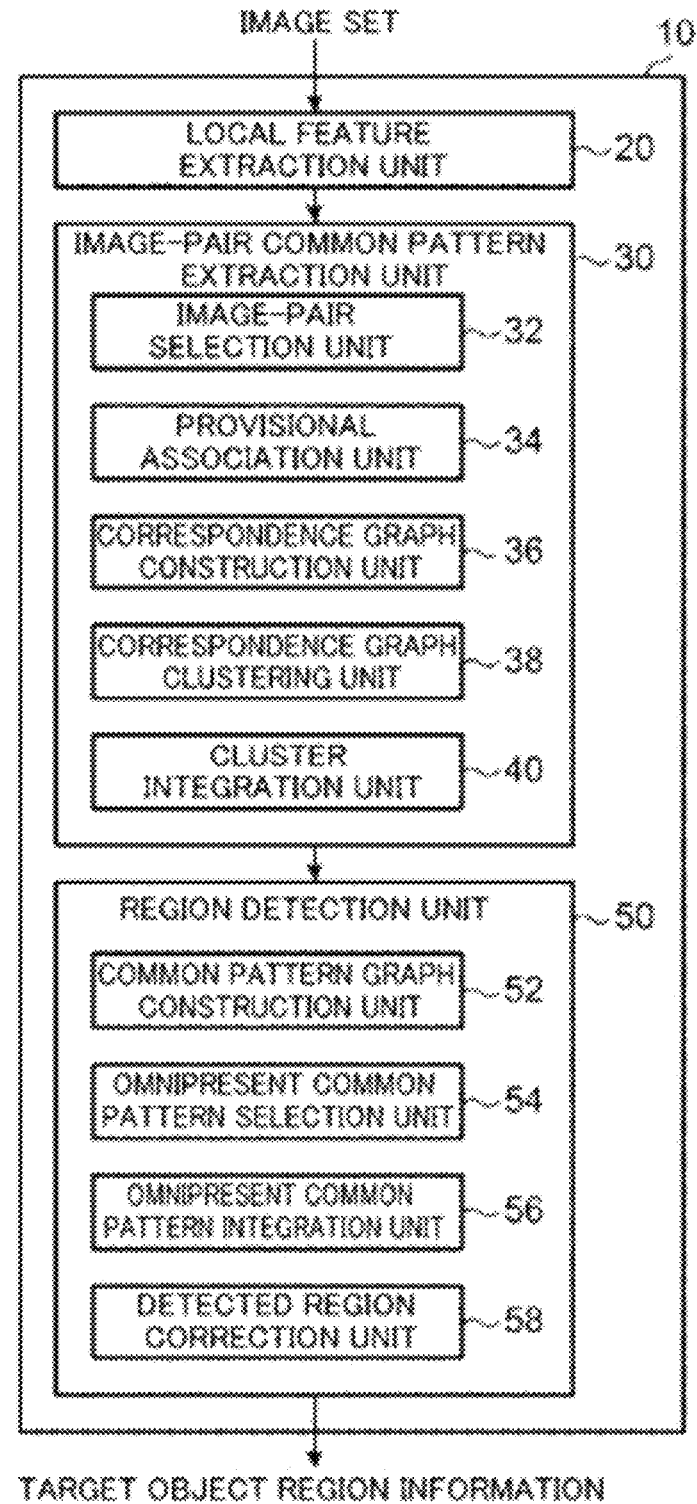
FIG. 2 is a functional block diagram of an object detection device according to the present embodiment.

As shown in FIG. 2, in terms of functionality, the object detection device 10 according to the present embodiment includes a local feature extraction unit 20, an image-pair common pattern extraction unit 30, and a region detection unit 50.

The local feature extraction unit 20 extracts a local feature from each of the images included in the input image set. Here, the local feature is constituted by feature description $d_p$ of a patch described below. The feature description $d_p$ of the patch is defined by the position $(x_p, y_p)$ of a feature point p in an image, attributes (scale $s_p$ and orientation $\theta_p$) of the feature point p, and the position and attributes of the feature point p. Note that N denotes the dimension of a feature descriptor.

$$d_p \in \mathbb{R}^N \quad \text{[Formula 1]}$$

Local feature extraction is constituted by feature point detection and feature description. A certain number of feature points are detected in one image. Any of the known technologies can be used for feature point detection. For example, as feature point detection technologies, DoG, Harris-Laplace, Hessian-Affine, Hessian-Hessian, Hessian Laplace, Harris Laplace, and the like disclosed in Reference Literature 1 can be used. A plurality of these methods can also be simultaneously used. In this case, there are cases where substantially the same feature points are detected by different methods. It is therefore desirable to exclude redundant feature points based on the position and attributes of the feature points.

Also, any feature description method may be used. As a feature description method, any of SIFT, SURF, and Spread-Out Descriptor disclosed in Reference Literature 2 may be used. Alternatively, all pixels that constitute the patch may be vectorized. Obtained feature description may undergo normalization processing, such as L2 normalization, for example.

[Reference Literature 1] K. Mikolajczyk et al., "A Comparison of Affine Region Detectors", in IJCV, 2005.

[Reference Literature 2] X. Zhang et al., "Learning Spread-out Local Feature Descriptors", in ICCV, 2017.

Figure 3:
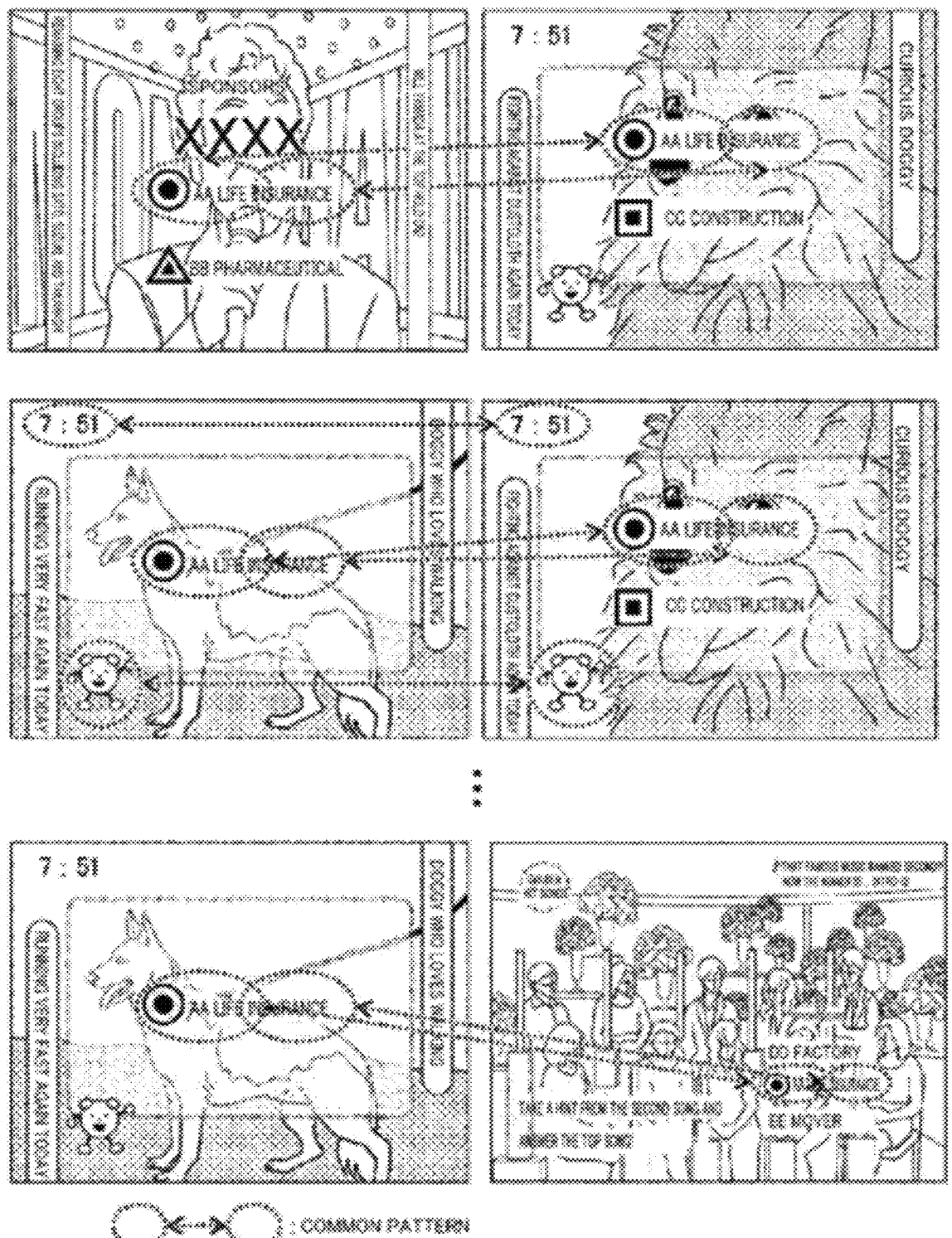
FIG. 3 is a diagram for illustrating extraction of a common pattern.

As shown in FIG. 3, the image-pair common pattern extraction unit 30 extracts the following patterns as patterns (hereinafter referred to as "common patterns") each of which has a common appearance in images that constitute an image pair, for each of one or more image pairs selected from the input image set. Each of the aforementioned patterns to be extracted is a common pattern that is constituted by a set of feature point pairs that have similar local features extracted by the local feature extraction unit 20, and that are geometrically similar to each other.

More specifically, the image-pair common pattern extraction unit 30 can be expressed as a configuration that includes an image-pair selection unit 32, a provisional association unit 34, a correspondence graph construction unit 36, a correspondence graph clustering unit 38, and a cluster integration unit 40.

The image-pair selection unit 32 selects one or more image pairs from the input image set. Any method may be used to select the image pairs. The image-pair selection unit 32 can select a combination of all of the image pairs, and randomly select a predetermined number of pairs from all of the image pairs, for example. The image-pair selection unit 32 can compare certain features extracted from the images, assuming each of the images as a node and build an undirected graph that connects particularly similar nodes (i.e. images) with an edge, and select an image pair corresponding to the nodes at two ends of each edge included in the graph.

The image-pair selection unit 32 may also select an image pair using the local features extracted by the local feature extraction unit 20. In this case, for example, it is possible to apply Ratio Test, in which association is performed only when the similarity of a feature point in one image that is the most similar to a feature point in the other image is sufficiently higher than the similarity of a feature point that is second similar, Cross Check, in which association is performed only when feature points of a feature point pair are most similar to each other, a method of using, as a similarity, the number of feature point pairs with a similarity or a distance between the feature points that meets a predetermined condition (threshold), or the like. The image-pair selection unit 32 may also integrate local features extracted from the images using a method disclosed in Reference Literature 3, and select an image pair using the distance between obtained vectors.

[Reference Literature 3] H. Jegou et al., "Aggregating Local Descriptors into a Compact Image Representation", in CVPR, 2010.

The image-pair selection unit 32 delivers information indicating the result of selecting the image pairs to the provisional association unit 34. The information indicating the result of selecting the image pairs may be a set of images id that is identification information regarding each of the images that constitute the image pairs, for example. In the following description, an image whose image id is x is referred to as an "image x". Note that the later-described processing performed by the provisional association unit 34, the correspondence graph construction unit 36, and the correspondence graph clustering unit 38 is independently performed for each of the image pairs.

The provisional association unit 34 performs the following processing for each of the image pairs indicated by the selection result delivered from the image-pair selection unit 32. In this processing, the provisional association unit 34 provisionally associates feature points with similar local features extracted by the local feature extraction unit 20, of the feature points in the aforementioned pair image. In the following description, a pair of feature points that are provisionally associated with each other is referred to as a "provisionally associated pair". Any method may be used to associate feature points with each other, and for example, the aforementioned methods such as Ratio Test, Cross Check, and threshold processing for the similarity or distance in a feature point pair can be used.

Figure 4:
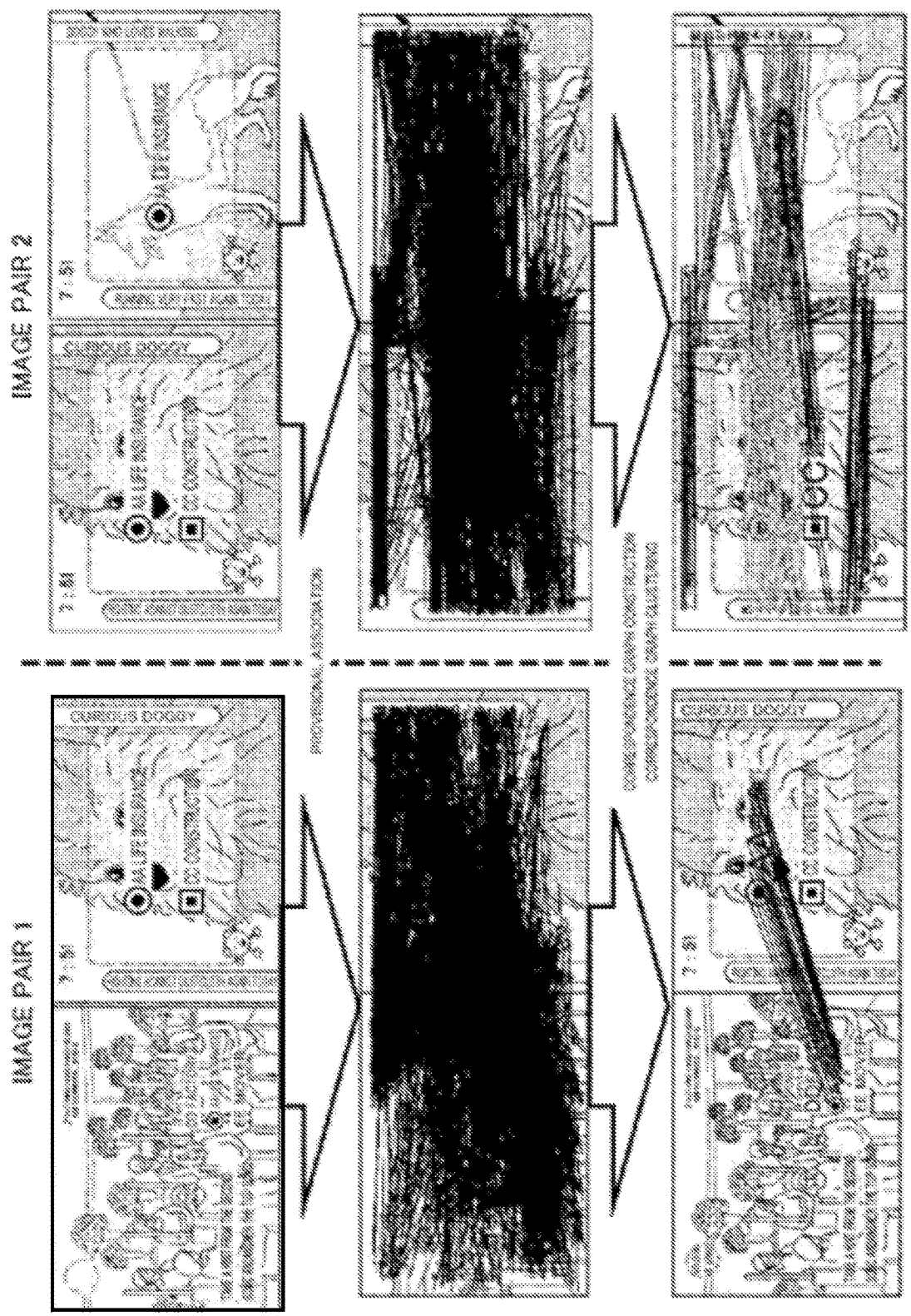
FIG. 4 is a diagram for illustrating extraction of a common pattern.

FIG. 4 shows an example of provisionally associated pairs. FIG. 4 shows provisionally associated pairs by connecting feature points that have similar local features between images, as shown in diagrams in the middle part, for each of the image pairs shown in the upper part.

The provisional association unit 34 delivers provisionally associated pair information to the correspondence graph construction unit 36. The provisionally associated pair information includes positions $(x_p, y_p)$ and attributes (scale $s_p$ and orientation $\theta_p$) of the feature points that constitute each provisionally associated pair.

The correspondence graph construction unit 36 construct a correspondence graph that is constituted by nodes that will be described next, and edges that will be described next. The aforementioned nodes are provisionally associated pairs indicated by the provisionally associated pair information delivered from the provisional association unit 34. The aforementioned edges connect nodes that correspond to two provisionally associated pairs that meet a condition indicating that the two provisionally associated pairs are geometrically consistent.

Figure 5:
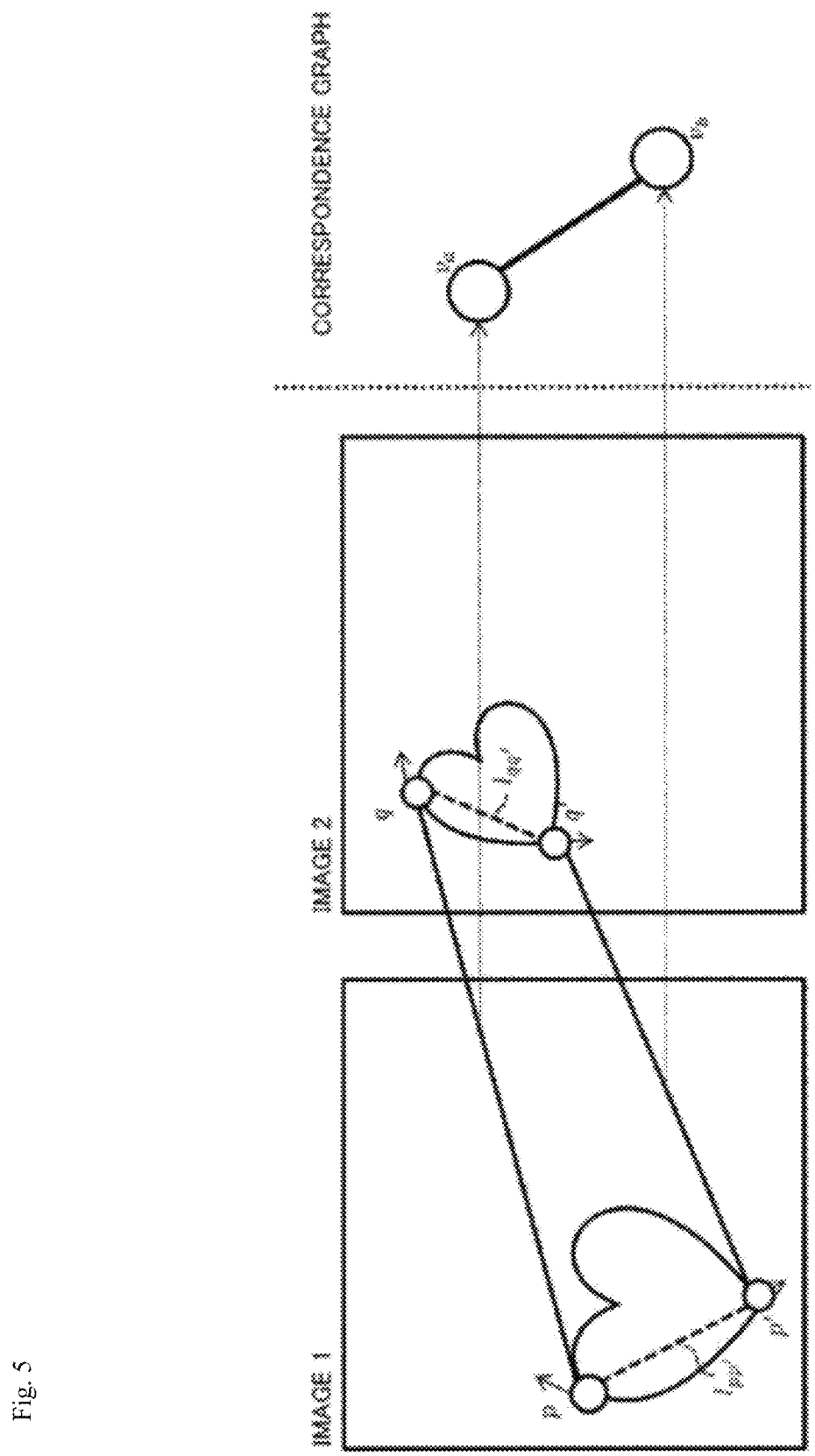
FIG. 5 is a diagram for illustrating construction of a correspondence graph.

For example, as shown in FIG. 5, the correspondence graph construction unit 36 generates a node $v_a$ corresponding to a provisionally associated pair {p, q} that is constituted by a feature point p in an image 1 and a feature point q in an image 2, and a node $v_b$ corresponding to a provisionally associated pair {p', q'} that is constituted by a feature point p' in the image 1 and a feature point q' in the image 2. Then, the correspondence graph construction unit 36 connects the node $v_a$ and the node $v_b$ to each other with an edge if the provisionally associated pair {p, q} and the provisionally associated pair {p', q'} meet the condition indicating that these provisionally associated pairs are geometrically consistent.

Here, the determination as to whether or not two provisionally associated pairs meet the condition indicating that these provisionally associated pairs are geometrically consistent is performed using the position and/or the attributes of each of the feature points that constitute the provisionally associated pairs. Any method may be used to realize this determination. Five examples of the condition indicating that two provisionally associated pairs are geometrically consistent are listed below.

(i) Distance Consistency

Actual positions corresponding to feature points on the same object are considered to be present spatially close to each other. This can be also said that feature points that constitute a pattern on an image indicating the same object are located spatially close to each other in the image. Thus, for example, a k-nearest undirected graph regarding the position of each feature point is construct, in advance, for a feature point set in each of the images that constitute an image pair (k is a predetermined parameter). Then, if, of the feature points that constitute the two provisionally associated pairs, feature points that are present on the same image (p and p', and q and q' in the example in FIG. 5) are connected in the built k-nearest undirected graph, it is determined that the two provisionally associated pairs meet the distance consistency, and "1" is output. On the other hand, if any of the feature points that are present on the same image is not connected in the built k-nearest undirected graph, it is determined that the two provisionally associated pairs do not meet the distance consistency, and "0" is output.

(ii) Consistency of Scale Ratio Between Feature Point and Common Pattern

It is assumed that the feature points that constitute the two provisionally associated pairs constitute a certain common pattern. In this case, the scale of this common pattern in each image can be estimated based on the distance between feature points on the same image, of the feature points that constitute the two provisionally associated pairs. It is conceivable that the ratio between the estimated scale of the common pattern and the scale included in the attributes of each feature point are consistent between the feature points that constitute the two provisionally associated pairs. Whether or not this consistency is met can be determined by the following Expression (1), for example.

[Formula 2]

$$\left[\frac{1}{\tau_s} \leq \frac{s_p / l_{pp'}}{s_q l_{qq'}} \leq \tau_s\right] \wedge \left[\frac{1}{\tau_s} \leq \frac{s_{p'} / l_{pp'}}{s_{q'} l_{qq'}} \leq \tau_s\right] \quad (1)$$

In Expression (1), $\tau_s$ denotes a parameter, $s_n$ denotes the scale of a feature point n, and $l_{nn'}$ denotes the distance between the feature point n and a feature point n' on the same image. [X] is a function that outputs 1 if a condition X is met, and outputs 0 if the condition X is not met.

(iii) Consistency of Relative Orientation Between Feature Point and Common Pattern Similar to the case (ii), it is assumed that the feature points that constitute the two provisionally associated pairs constitute a certain common pattern. In this case, an orientation of the common pattern in each image can be estimated based on the positional relationship between feature points on the same image, of the feature points that constitute the two provisionally associated pairs. It is considered that the relative orientation formed by the orientation of the estimated common pattern and the orientation included in the attributes of each feature point is consistent between the feature points that constitute the two provisionally associated pairs. Whether or not this consistency is met can be determined by the following Expression (2), for example.

[Formula 3]

$$\left[\left|\theta_p \angle \overline{pp'}\right| - \left|\theta_q - \angle \overline{qq'}\right| \leq \tau_\theta\right] \wedge \left[\left|\theta_{p'} \angle \overline{p'p}\right| - \left|\theta_{q'} - \angle \overline{q'q}\right| \leq \tau_\theta\right] \quad (2)$$

In Expression (2), $\tau_\theta$ denotes a parameter, and $\theta_n$ denotes the orientation of the feature point n.

$\angle \overline{nn'}$ denotes the orientation of a vector $\overline{nn'}$.  [Formula 4]

(iv) Consistency of Scale of Pattern

Depending on the object to be detected, there are cases where the scale of a pattern that appears in the images and indicates this object is fixed. Whether or not this consistency is met can be determined by the following Expression (3), for example.

[Formula 5]

$$\left[\frac{1}{\tau_a} \leq \frac{l_{pp'}}{l_{qq'}} \leq \tau_a\right] \quad (3)$$

In Expression (3), $\tau_a$ denotes a parameter.

(v) Consistency of Direction of Pattern

Similar to the case (iv), depending on the object to be detected, there are cases where the direction of a pattern that appears in the images and indicates the object is fixed. Whether or not this consistency is met can be determined by the following Expression (4), for example.

[Formula 6]

$$\left[\left|\angle \overline{pp'} - \angle \overline{qq'}\right| \leq \tau_b\right] \quad (4)$$

In Expression (4), $\tau_b$ denotes a parameter.

For example, the correspondence graph construction unit 36 connects, with an edge, nodes that correspond to provisionally associated pairs regarding which 1 is output for all of the above consistency conditions (i) to (v). Thus, the correspondence graph construction unit 36 can construct a correspondence graph. Note that nodes may be connected with an edge if 1 is output for any one of the above consistency conditions (i) to (v), or if 1 is output for a predetermined number (e.g. three) of consistency conditions or more.

The correspondence graph construction unit 36 delivers the constructed correspondence graph to the correspondence graph clustering unit 38.

Figure 6:
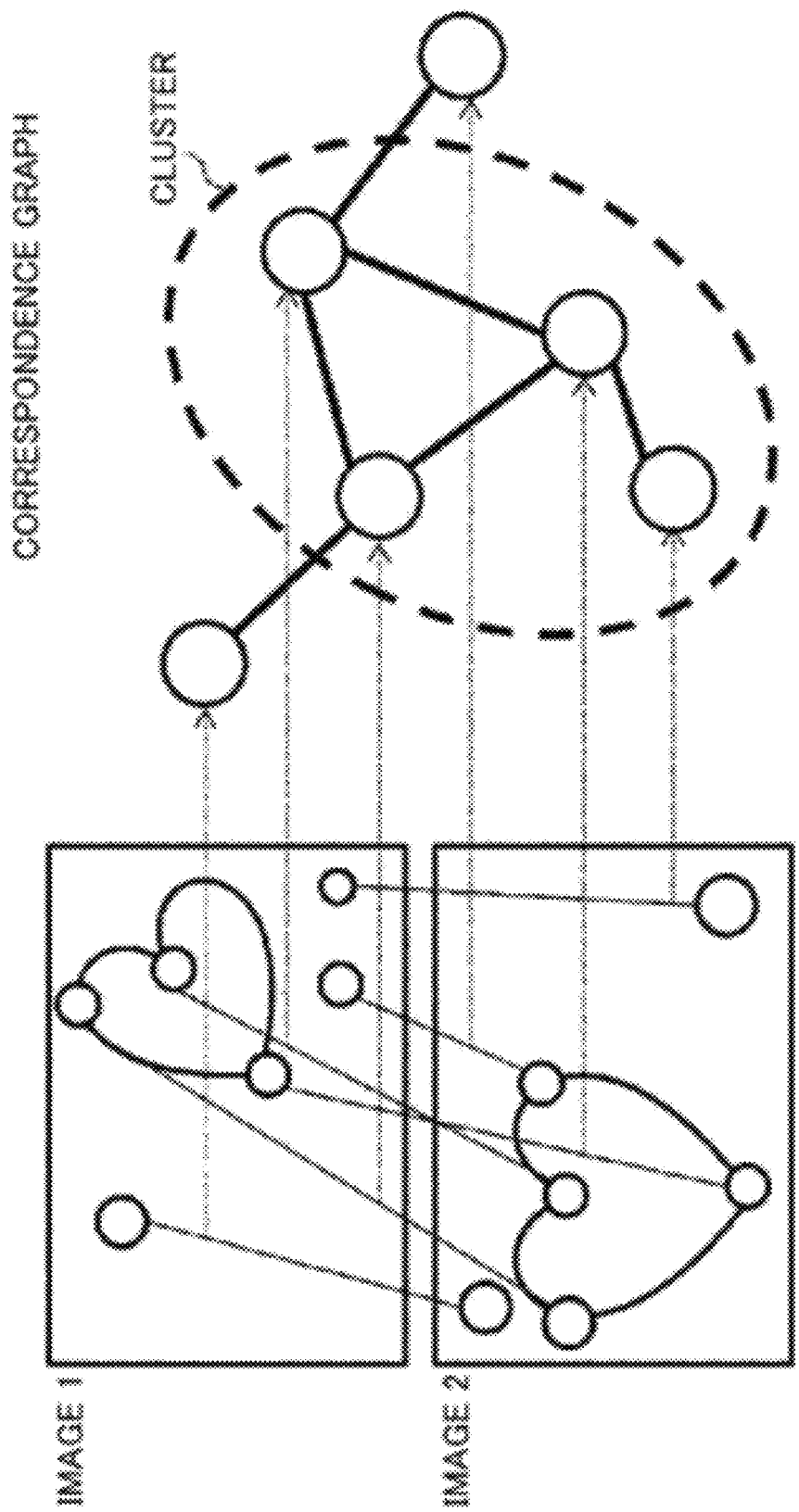
FIG. 6 is a diagram for illustrating clustering of the correspondence graph.

As shown in FIG. 6, in the correspondence graph constructed by the correspondence graph construction unit 36, nodes corresponding to the provisionally associated pairs of feature points that constitute the same common pattern are connected to each other with edges, and are considered to form a cluster.

The correspondence graph clustering unit 38 extracts clusters such as the aforementioned one, from the correspondence graph delivered from the correspondence graph construction unit 36. Any number of clusters may be extracted. Here, as for the clusters to be extracted, clusters are extracted that are not constituted by feature points of a common provisionally associated pair, with respect to all of the provisionally associated pairs included in the clusters. This condition can be considered as a natural assumption, if consideration is given to the fact that, while a certain feature point in an image is possibly included in a plurality of provisionally associated pairs, one feature point in one image cannot be physically associated with a plurality of feature points in another image.

Figure 14:
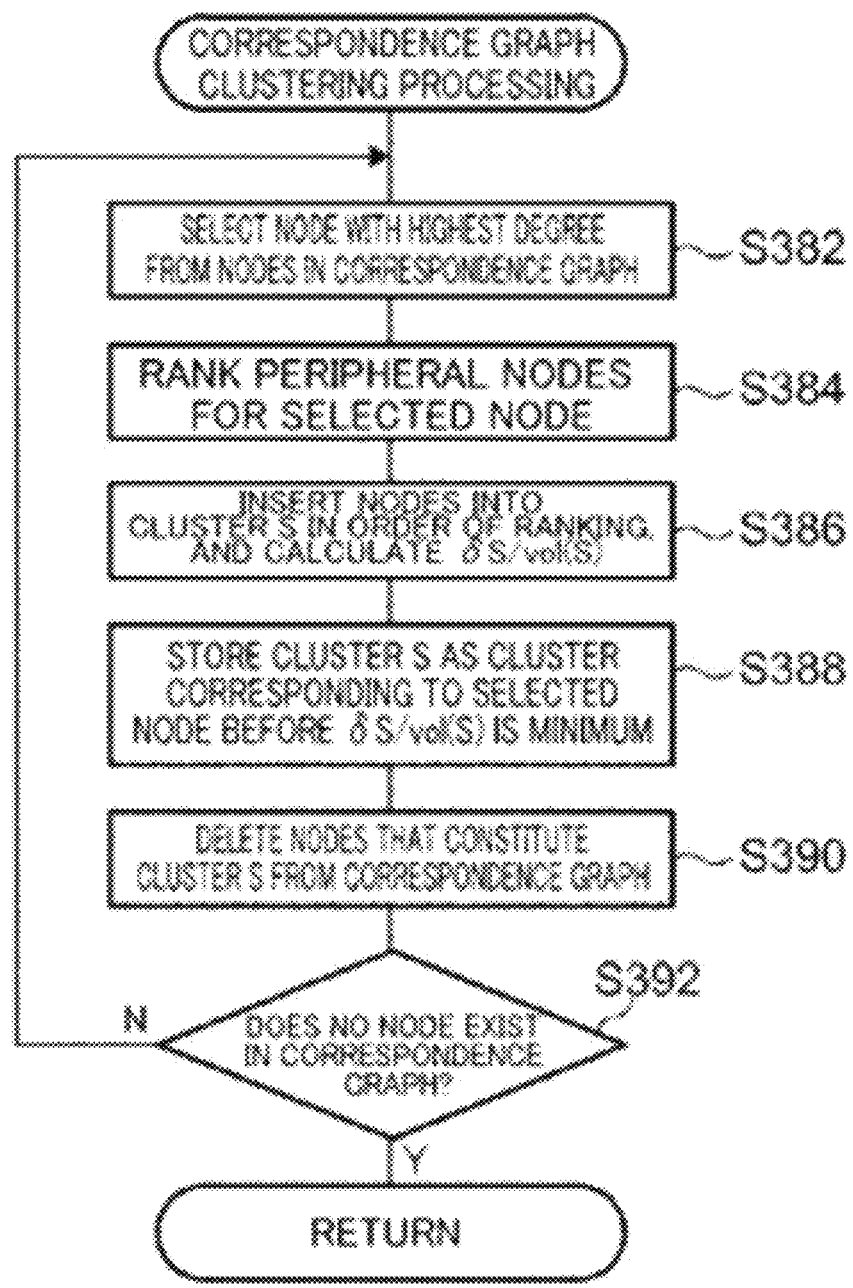
FIG. 14 is a flowchart showing an example of correspondence graph clustering processing.

As a clustering method, any clustering method that meets the aforementioned condition can be used. For example, the correspondence graph clustering unit 38 can use a method of extracting clusters that meet the following Expression (5) by means of an algorithm described as correspondence graph clustering processing (FIG. 14; the details will be described later).

[Formula 7]

$$S = \underset{S}{\mathrm{argmin}} \frac{\delta S}{vol(S)} \quad (5)$$
$$\text{s.t.} \forall c_n \in S, \forall c_m \in S, c_n \neq c_m, c_n \cap c_m = \emptyset$$

In Expression (5), $\delta S$ denotes the sum of edges that connect a node set S and a difference set between a graph G and S, and $vol(S)$ denotes a degree sum of nodes in the node set S.

The correspondence graph clustering unit 38 delivers information regarding the extracted clusters to the cluster integration unit 40. Information regarding the clusters includes information regarding nodes (provisionally associated pairs) included in the clusters.

FIG. 4 shows an example of clustered provisionally associated pairs. In FIG. 4, for the provisionally associated pairs shown in the middle part, provisionally associated pairs corresponding to nodes included in the clusters extracted from the constructed correspondence graph are connected with lines. Note that, in the example in FIG. 4, the color of lines indicating the provisionally associated pairs included in the clusters are made different between the extracted clusters.

Regarding patterns (regions) that are indicated by a feature point set that constitute the provisionally associated pairs corresponding to the nodes included in the clusters extracted by the correspondence graph clustering unit 38, a plurality of such patterns that overlap each other are extracted in some cases. These overlapping patterns are highly likely to form a pattern corresponding to one object.

The cluster integration unit 40 bundles patterns that have a high degree of spatial overlapping, of the patterns indicated by respective pieces of cluster information delivered from the correspondence graph clustering unit 38, into one pattern. Any method may be used to realize this. For example, a method can be used in which the degree of overlapping is evaluated using Jaccard similarity for each of the regions that are defined as convex hulls of feature point sets that constitute the provisionally associated pairs corresponding to the nodes included in the clusters, and regions that are greater than or equal to a predetermined threshold are bundled into one region.

The cluster integration unit 40 delivers, to the region detection unit 50, information regarding the integrated regions as information indicating common patterns.

Figure 7:
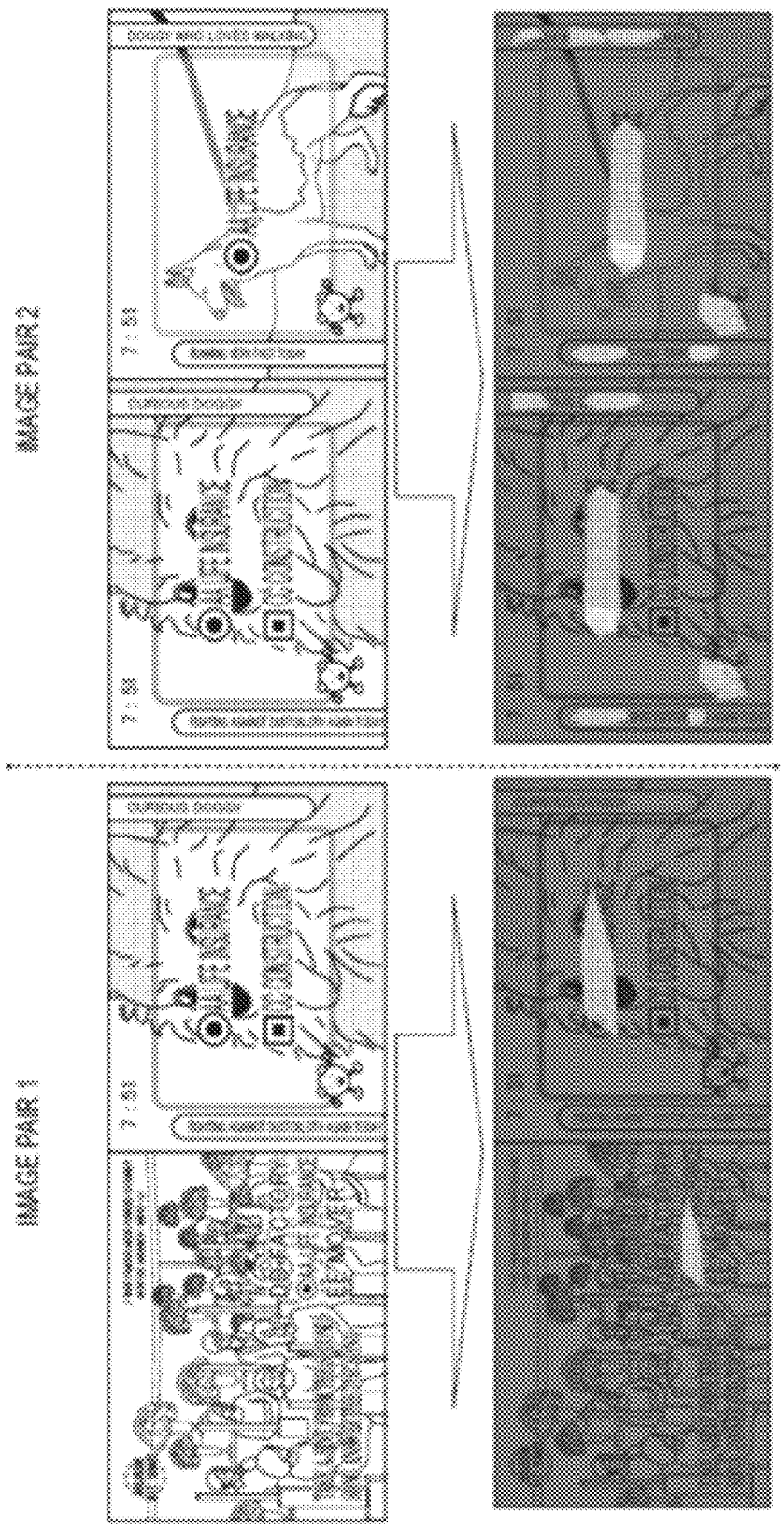
FIG. 7 is a diagram schematically showing examples of common patterns extracted by an image-pair common pattern extraction unit.

The common patterns extracted by the image-pair common pattern extraction unit 30 are common patterns that are extracted without using any prior knowledge of the target object. For this reason, the extracted common patterns may include a common pattern that captures only a portion of the target object, and common patterns that do not correspond to the target object, as shown in FIG. 7. Note that, in FIG. 7, portions with higher pixel values (paler portions) than other portions indicate the common patterns extracted by the image-pair common pattern extraction unit 30.

Figure 8:
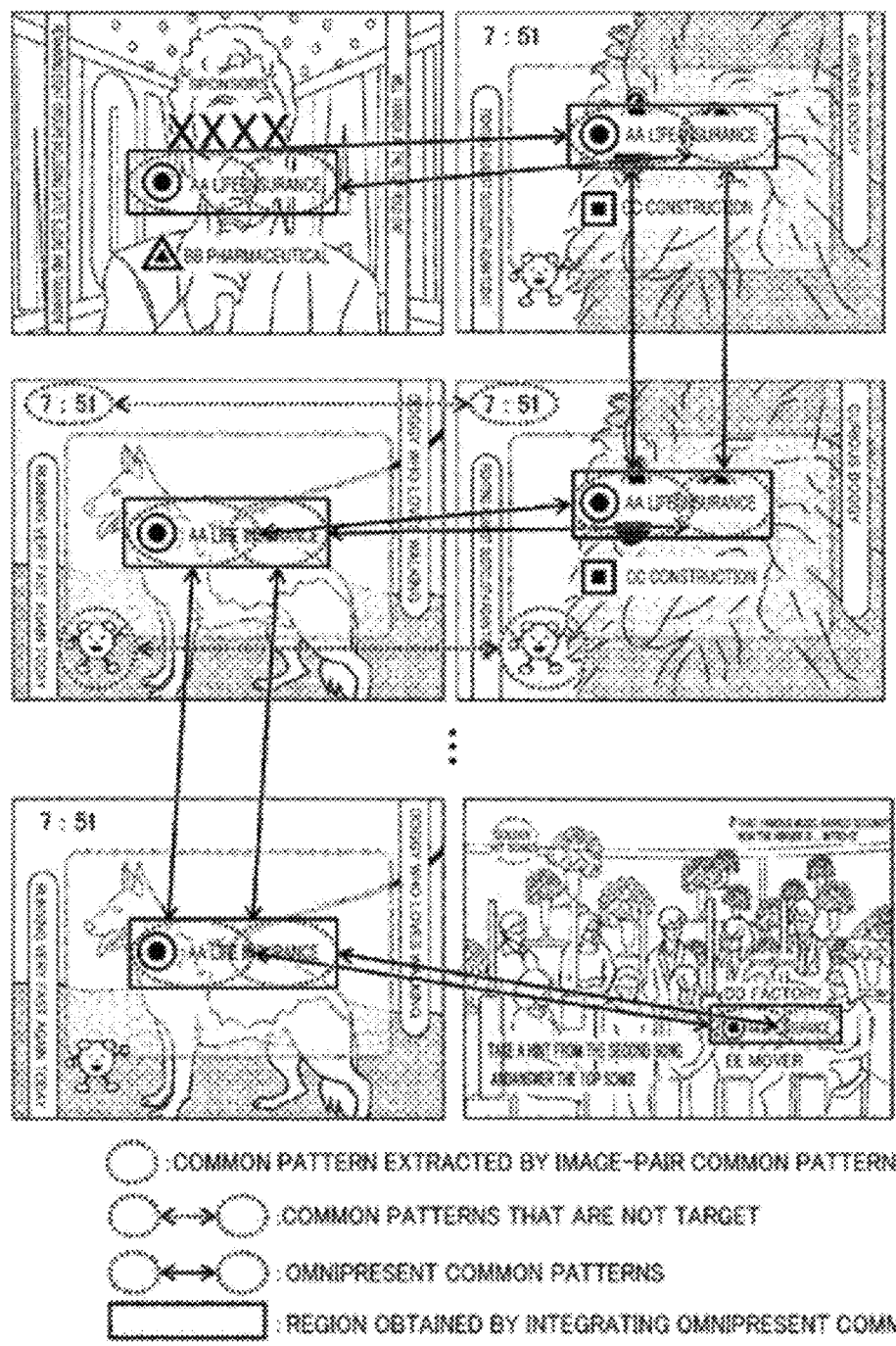
FIG. 8 is a diagram for illustrating selection of an omnipresent common pattern.

As shown in FIG. 8, the region detection unit 50 detects, as a target object region, a region that is based on a common pattern that is omnipresent in the image set (hereinafter referred to as an "omnipresent common pattern"), of the common patterns extracted by the image-pair common pattern extraction unit 30.

More specifically, the region detection unit 50 can be represented as a configuration that includes a common pattern graph construction unit 52, an omnipresent common pattern selection unit 54, an omnipresent common pattern integration unit 56, and a detected region correction unit 58.

The common pattern graph construction unit 52 constructs a common pattern graph. In the above-described common pattern graph, each of the common patterns extracted by the image-pair common pattern extraction unit 30 is a node, and nodes corresponding to a common pattern that is common in each of the image included in an image set and between the images are connected to each other with edges.

Figure 9:
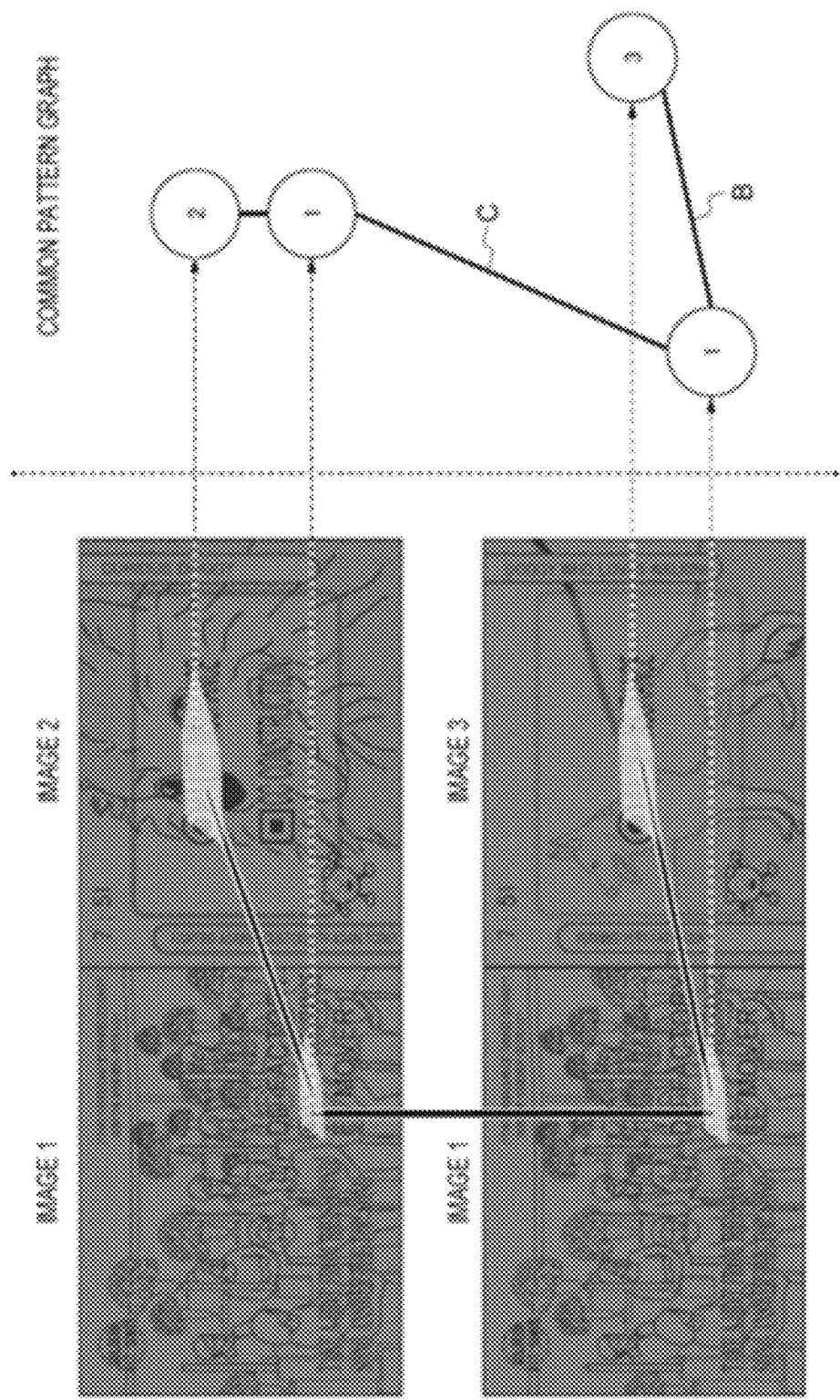
FIG. 9 is a diagram for illustrating construction of a common pattern graph.

Specifically, as shown in FIG. 9, the common pattern graph construction unit 52 generates nodes corresponding to the common pattern extracted from the images that constitute each of the image pairs, and assigns image ids of the images from which the common pattern is extracted, to the corresponding nodes. In the example in FIG. 9, the number in each node indicates an image id.

The common pattern graph construction unit 52 connects nodes corresponding to a common pattern with edges. The aforementioned common pattern has been extracted as a common pattern between the image pairs by the image-pair common pattern extraction unit 30. In the example in FIG. 9, when the image 1 and the image 2 are selected as an image pair, the node corresponding to the common pattern extracted in the image 1 and the node corresponding to the common pattern extracted from the image 2 are connected with an edge (A in FIG. 9). Similarly, in this example, when the image 1 and the image 3 are selected as an image pair, the nodes corresponding to the common pattern extracted from the image 1 and the common pattern extracted from the image 3 are connected with an edge (B in FIG. 9).

Also, the common pattern graph construction unit 52 connects, with an edge, nodes corresponding to a common pattern that will be described next. The aforementioned common pattern is a common pattern that is extracted in image pairs when the same image is selected as different image pairs, and the degree of overlapping of the common pattern in the image is greater than or equal to a predetermined value. Any method may be used to calculate the degree of overlapping of the common pattern in the image. The aforementioned degree of overlapping can be calculated using the Jaccard coefficient between binary masks corresponding to the common pattern, for example. In the example in FIG. 9, nodes corresponding to the common pattern extracted from the image 1 when the image 1 and the image 2 are selected as an image pair, and the common pattern extracted from the image 1 when the image 1 and the image 3 are selected as an image pair, are connected with an edge (C in FIG. 9).

The common pattern graph construction unit 52 delivers the constructed common pattern graph to the omnipresent common pattern selection unit 54.

The omnipresent common pattern selection unit 54 detects one or more arbitrary paths from the common pattern graph delivered from the common pattern graph construction unit 52. Then, the omnipresent common pattern selection unit 54 evaluates the degree to which an image id set corresponding to a node set that constitutes the detected paths covers all of the image ids of the input image set, and thus selects a common pattern that is "omnipresent" in many images. Any method may be used to detect paths from the common pattern graph. For example, the omnipresent common pattern selection unit 54 randomly selects one or more nodes, and perform depth-first search and width-first search using each of the selected nodes as a start node, and thus can detect paths.

Thus, for example, a common pattern "AA" and a common pattern "Life Insurance" that are omnipresent over the entire image set are selected as omnipresent common patterns, as shown in FIG. 8. Meanwhile, common patterns (time indication on the upper left side of the screen, and a character portion on the lower left side) included in the image pair shown in the middle part of FIG. 8 are not omnipresent over the entire image set, and are therefore not selected as omnipresent common patterns.

The omnipresent common pattern selection unit 54 delivers information regarding the selected omnipresent common patterns to the omnipresent common pattern integration unit 56.

The omnipresent common pattern integration unit 56 specifies a target object region by integrating the omnipresent common patterns delivered from the omnipresent common pattern selection unit 54, in each image. Any method may be used to integrate the omnipresent common patterns. For example, if, regarding each of two omnipresent common patterns, a path pair obtained by the omnipresent common pattern selection unit 54 occurs in completely the same subset in the common pattern graph, the omnipresent common pattern integration unit 56 can specify, as the target object region, the minimum bounding rectangle that entirely encompass the two omnipresent common patterns. Also, the omnipresent common pattern integration unit 56 may integrate the omnipresent common patterns while giving consideration to the overlapping of the omnipresent common patterns in the same image.

The omnipresent common pattern integration unit 56 delivers information regarding the specified target object region to the detected region correction unit 58.

The region specified by the omnipresent common pattern integration unit 56 is a region estimated based on the position of the feature point set. For this reason, this region does not necessarily accurately capture the boundary of the object.

Figure 10:
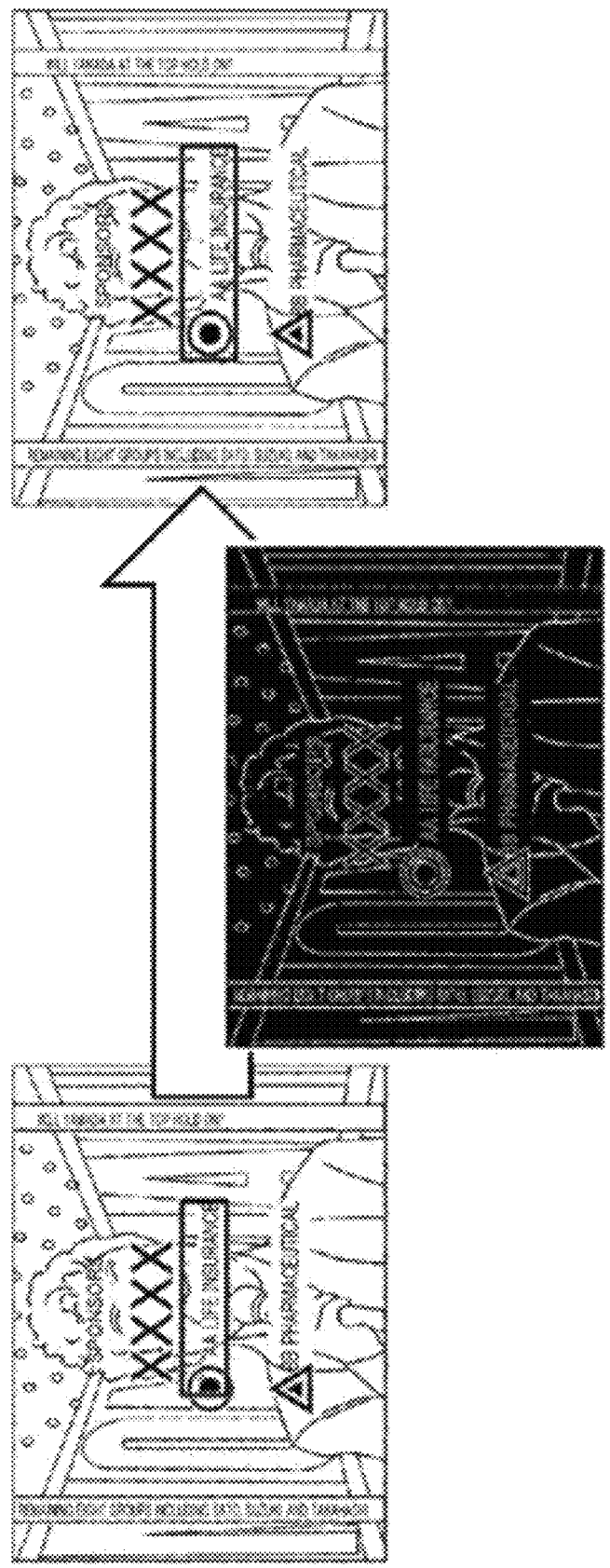
FIG. 10 is a diagram for illustrating correction of a target object region.

Thus, as shown in FIG. 10, the detected region correction unit 58 corrects the target object region delivered from the omnipresent common pattern integration unit 56, using boundary line information that is extracted from the image. Any method may be used for correction. For example, a method can be used in which a correction is made to form a region that does not straddle edges detected from the image to the extent possible, as disclosed in Reference Literature 4.

[Reference Literature 4] C. L. Zitnick et al., "Edge Boxes: Locating Object Proposals from Edges", in ECCV, 2014.

Figure 11:
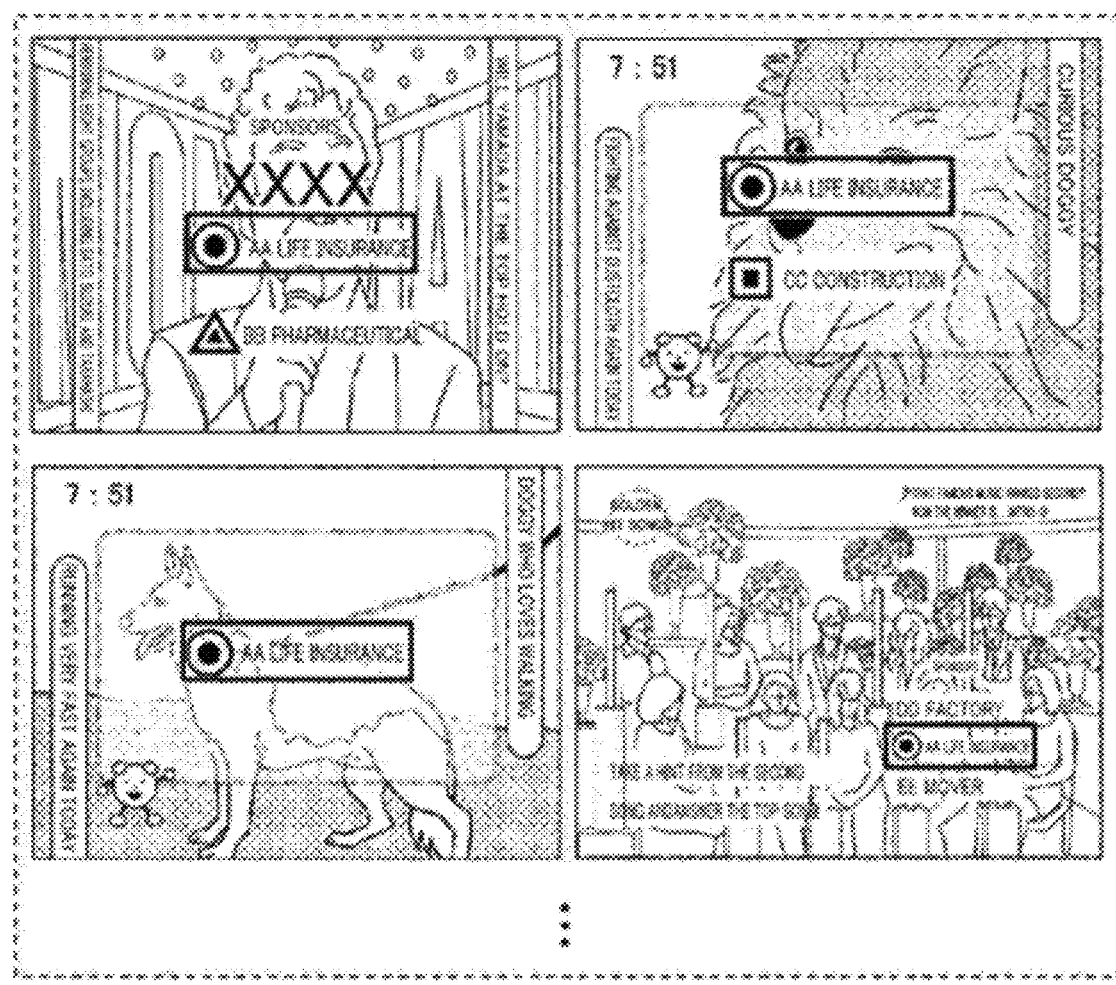
FIG. 11 is a diagram schematically showing an example of the result of detecting target object regions.

The detected region correction unit 58 outputs target object region information that indicates position information regarding the corrected target object region. For example, the target object region information may be coordinate information regarding four corners of a rectangular region that indicates the target object region. As shown in FIG. 11, the detected region correction unit 58 can output a rectangle indicated by the target object region information in a superimposing manner on each of the images included in the input image set.

Next, effects of the object detection device 10 according to the present embodiment will be described with reference to FIG. 12. Note that FIG. 12 is a flowchart showing an example of a processing flow of the object detection program according to the present embodiment.

Figure 12:
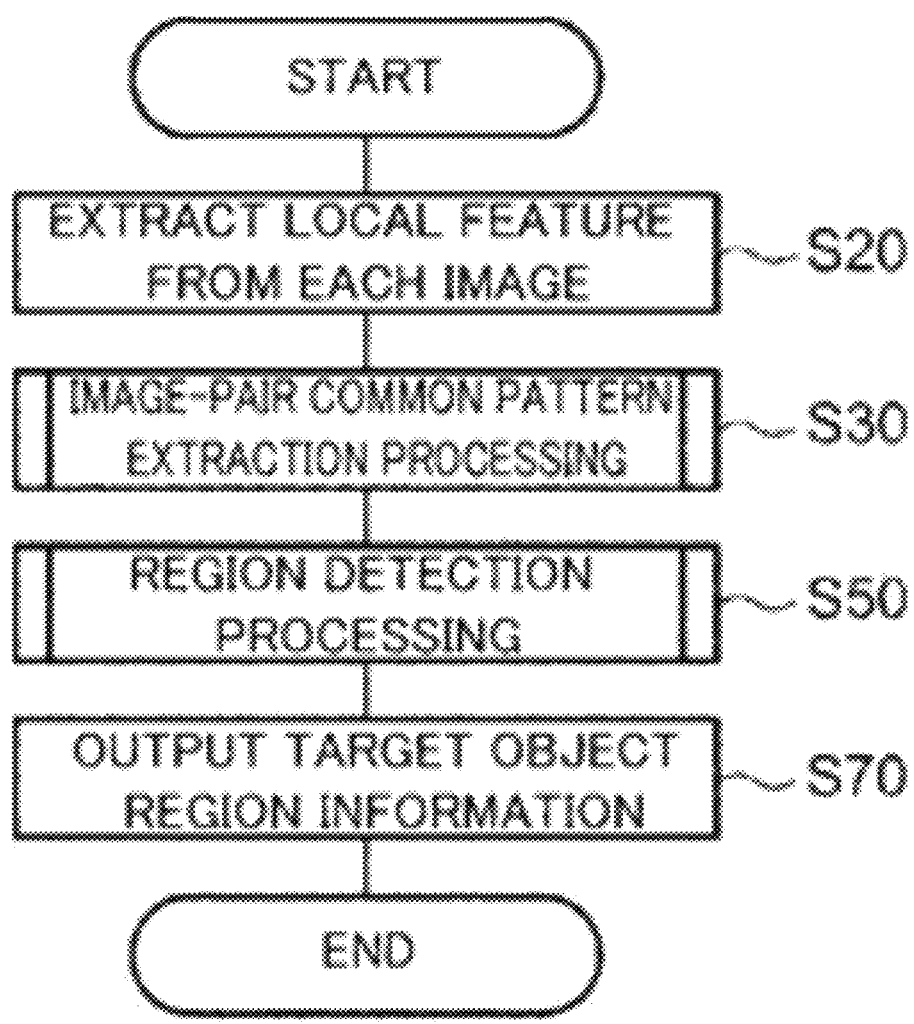
FIG. 12 is a flowchart showing an example of object detection processing according to the present embodiment.

In step S20 in FIG. 12, the local feature extraction unit 20 extracts local features from each of the images included in an input image set.

Figure 13:
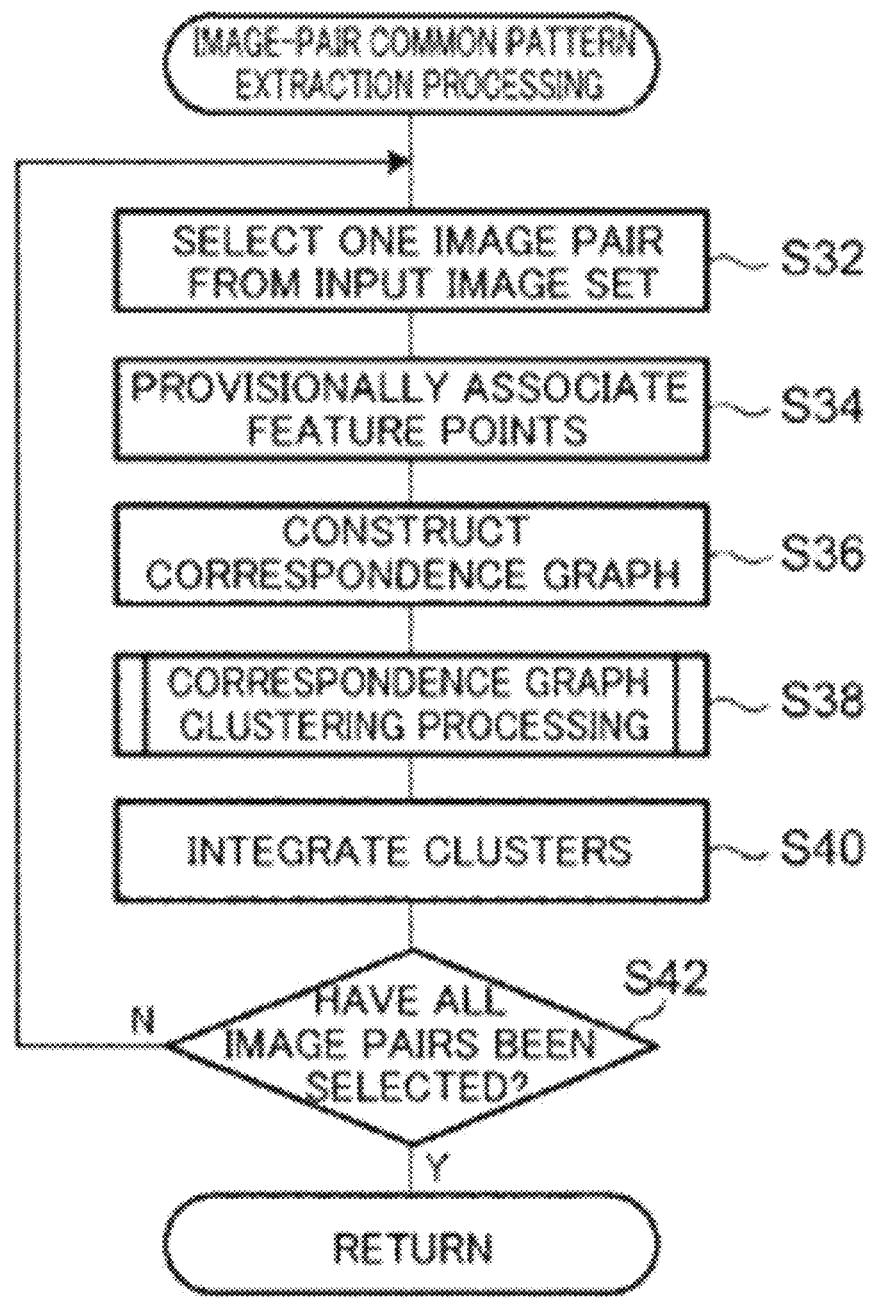
FIG. 13 is a flowchart showing an example of image-pair common pattern extraction processing.

Next, in step S30, image-pair common pattern extraction processing shown in FIG. 13 is performed.

In step S32 in FIG. 13, the image-pair selection unit 32 selects one image pair from the input image set.

Next, in step S34, the provisional association unit 34 provisionally associates feature points whose local features extracted in the aforementioned step S20 are similar to each other, in the image pair selected in the aforementioned step S32.

Next, in step S36, the correspondence graph construction unit 36 uses provisionally associated pairs that have been provisionally associated in the aforementioned step S34 as nodes, and constructs a correspondence graph in which nodes corresponding to the provisionally associated pairs that meet the condition indicating that these provisionally associated pairs are geometrically consistent are connected with an edge.

Next, in step S38, correspondence graph clustering processing shown in FIG. 14 is performed.

In step S382 in FIG. 14, the correspondence graph clustering unit 38 selects a node with the highest degree from the nodes in the correspondence graph constructed in the aforementioned step S36.

Next, in step S384, the correspondence graph clustering unit 38 uses the selected node as a start node, and ranks surrounding nodes using a pagerank algorithm or the like. For example, by using an approximate pagerank algorithm disclosed in Reference Literature 5, the surrounding nodes can be ranked at a calculation cost that does not depend on the graph size.

[Reference Literature 5] R. Andersen et al., "Local Graph Partitioning using PageRank Vectors", in FOCS, 2006.

Next, in step S386, the correspondence graph clustering unit 38 inserts the nodes into a cluster S in the order of the ranking obtained in the aforementioned step S384. Every time a node is inserted into the cluster S, the correspondence graph clustering unit 38 calculates $\delta S/vol(S)$ and stores the calculation result in a predetermined storage area. At this time, if a feature point that constitutes a provisionally associated pair corresponding to a node that is to be newly inserted is used as a feature point that constitutes a provisionally associated pair corresponding to an already selected node, this node is not included in the cluster.

Next, in step S388, the correspondence graph clustering unit 38 stores a node set that has been inserted into the cluster S before δS/vol(S) calculated in the aforementioned step S386 is the minimum, as a cluster corresponding to the start node selected in the aforementioned step S382.

Next, in step S390, the correspondence graph clustering unit 38 deletes, from the correspondence graph, the nodes that constitute the cluster S obtained in the aforementioned step S388.

Next, in step S392, the correspondence graph clustering unit 38 determines whether or not no more nodes exist in the correspondence graph. If any node still exists, the processing returns to step S382. If no more nodes exist, the correspondence graph clustering processing ends, and the processing returns to the image-pair common pattern extraction processing (FIG. 13).

Note that processing for cleansing the cluster obtained in the aforementioned step S388 using any method may also be added. For example, if the number of nodes that constitute a cluster is small, these nodes are likely to be accidentally similar to each other. For this reason, processing for discarding a cluster in which the number of nodes is smaller than or equal to a predetermined threshold can be added. Also, if the convex hull region defined by a feature point set that constitutes a patter is small, these feature points are also likely to be accidentally similar to each other. For this reason, processing for performing threshold processing on the area of each convex hull region and discarding a cluster that is smaller than or equal to a threshold may also be added.

Next, in step S40 in FIG. 13, common patterns corresponding to the clusters obtained by the clustering in the aforementioned step S38 that have a high degree of spatial overlapping are integrated.

Next, in step S42, the image-pair selection unit 32 determines whether or not all of the image pairs in the input image set have been selected. If any of the image pair has not been selected, the processing returns to step S32, and if all of the image pairs have already been selected, the image-pair common pattern extraction processing ends, and the processing returns to the object detection processing (FIG. 12).

Figure 15:
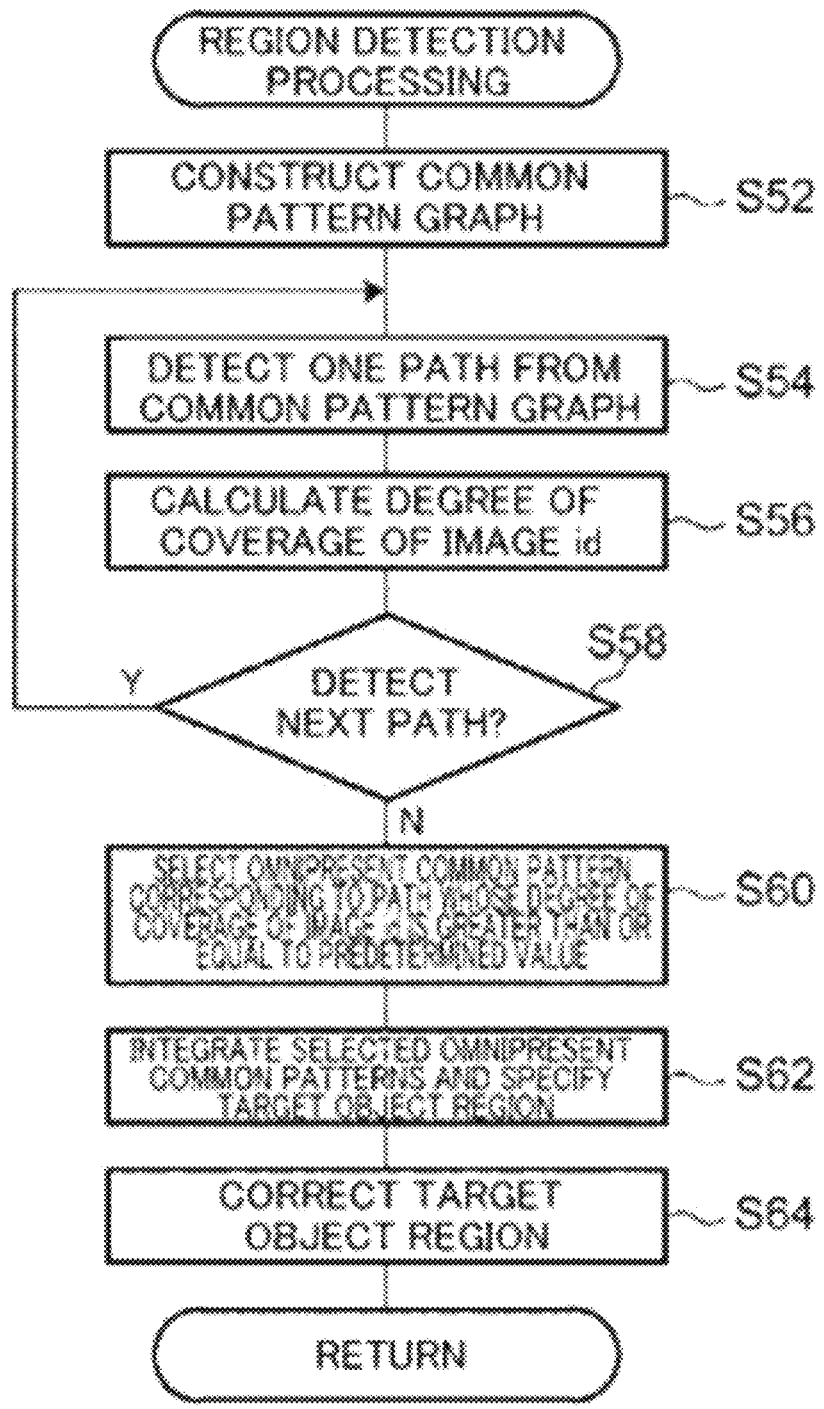
FIG. 15 is a flowchart showing an example of region detection processing.
Figure 16:
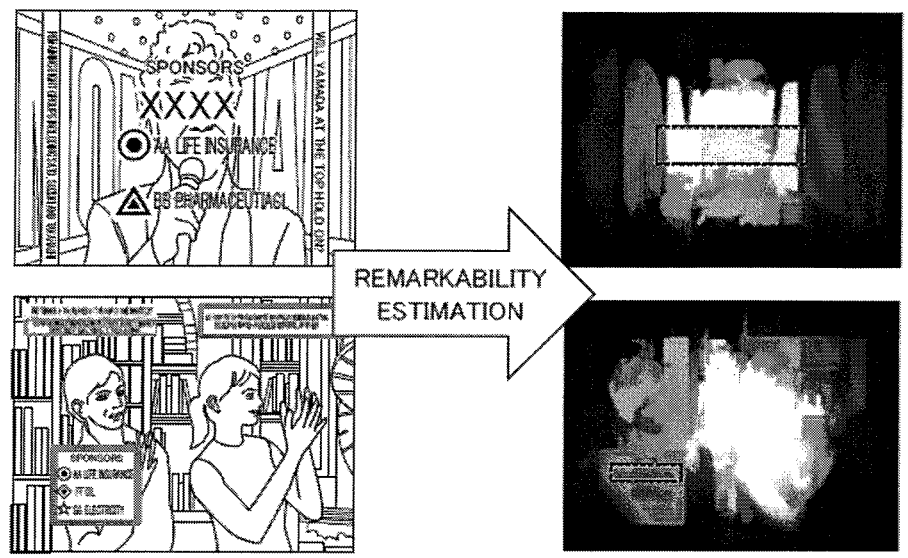
FIG. 16 is a diagram for illustrating a problem in the case of detecting a highly remarkable region as a target object region.
Figure 17:
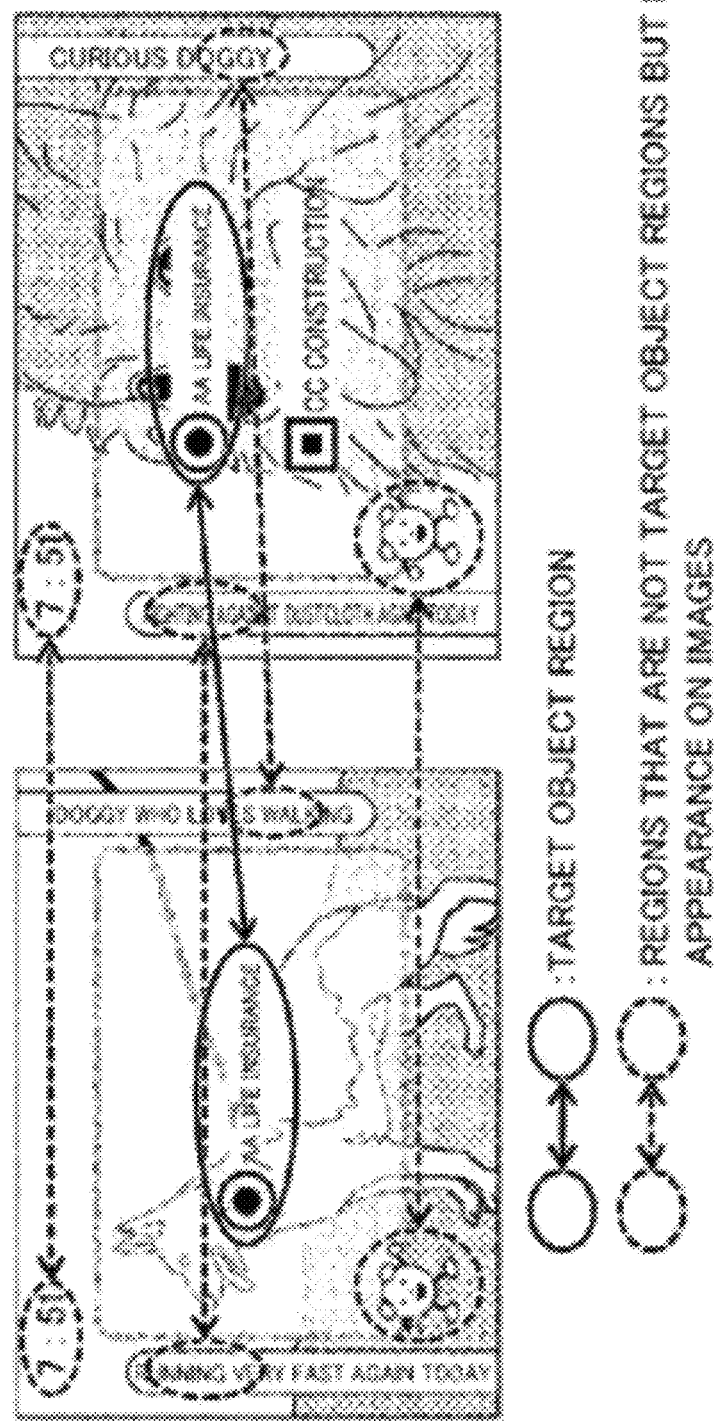
FIG. 17 is a diagram for illustrating a problem in the case of detecting a common pattern in an image pair as a target object region.

Next, in step S50 in FIG. 12, region detection processing shown in FIG. 15 is performed.

In step S52 in FIG. 15, the common pattern graph construction unit 52 uses each of the common patterns extracted in the aforementioned step S30 as a node, and constructs a common pattern graph in which nodes corresponding to a common pattern that is common within each image and between images included in the image set are connected with an edge.

Next, in step S54, the omnipresent common pattern selection unit 54 detects one arbitrary path from the common pattern graph constructed in the aforementioned step S52.

Next, in step S56, the omnipresent common pattern selection unit 54 calculates a degree of coverage that indicates the degree to which an image id set corresponding to a node set that constitutes the detected path covers all of the image ids in the input image set.

Next, in step S58, the omnipresent common pattern selection unit 54 determines whether or not the next path is to be detected from the common pattern graph. In the case of detecting the next path, the processing returns to step S54. If path detection ends, the processing proceeds to step S60.

In step S60, the omnipresent common pattern selection unit 54 selects, as an omnipresent common pattern, a common pattern corresponding to a path whose degree of coverage calculated in the aforementioned step S56 is greater than or equal to a predetermined value.

Next, in step S62, the omnipresent common pattern integration unit 56 integrates the omnipresent common patterns selected in the aforementioned step S60 within each image, and specifies the target object region.

Next, in step S64, the detected region correction unit 58 corrects the target object region specified in the aforementioned step S62 using boundary line information extracted from the images. Then, the region detection processing ends, and the processing returns to the object detection processing (FIG. 12).

Next, in step S70 in FIG. 12, the detected region correction unit 58 outputs target object region information indicating position information regarding the target object region that has been corrected in the aforementioned step S64, and the object detection processing ends.

As described above, with the object detection device according to the present embodiment, a common pattern that have a common appearance on images in an image pair in an input image set is extracted as a candidate target object region. Thus, the object detection device according to the present embodiment extracts a common pattern without making an assumption about the position, size, contrast, or the like of the target object region. Thus, even a region that does not meet a remarkability condition that is assumed in the conventional technologies can be accurately extracted as a candidate target object region. Also, with the object detection device according to the present embodiment, a common pattern that is omnipresent in the input image set, of common patterns extracted from image pairs, is selected as a target object region. Thus, a common pattern that is not a target and may be included in a specific image pair in the input image set can be excluded from candidate target object regions.

That is to say, with the object detection device according to the present embodiment, even if an object to be detected is not remarkable in images, and the input includes images including regions that are not the object to be detected and have, in an image pair, a common appearance on the images, a region indicating the object to be detected can be accurately detected.

Note that the configuration of each part of the object detection device described in the above embodiment is an example, and may be modified in accordance with a situation without departing from the gist.

The processing flow of the program described in the above embodiment is also an example, and unnecessary steps may be deleted, new steps may be added, and the order of performing the processing may be changed without departing from the gist.

The above embodiment has described the case where the processing according to the embodiment is realized with a software configuration using a computer by executing the program. However, the invention is not limited thereto. The embodiment may alternatively be realized by a hardware configuration, or a combination of a hardware configuration and a software configuration, for example.

REFERENCE SIGNS LIST

10 Object detection device
20 Local feature extraction unit
30 Image-pair common pattern extraction unit 32 Image-pair selection unit
34 Provisional association unit
36 Correspondence graph construction unit
38 Correspondence graph clustering unit
40 Cluster integration unit
50 Region detection unit
52 Common pattern graph construction unit
54 Omnipresent common pattern selection unit
56 Omnipresent common pattern integration unit
58 Detected region correction unit

The invention claimed is:

1. An object detection device comprising:
a memory; and
a processor that is coupled to the memory and that is configured to:
extract a local feature of a feature point from each image included in an input image set;
extract, from each image pair selected from images included in the image set, a common pattern configured by a set of feature point pairs that have similar local features extracted in images configuring the image pair, the set of feature point pairs being geometrically similar to each other; and
detect, as a region indicating an object to be detected in each image included in the image set, a region that is based on a common pattern that is omnipresent in the image set, among extracted common patterns.

2. The object detection device according to claim 1, wherein extracting the image-pair common pattern includes:
selecting an image pair from the image set;
provisionally associating feature points that have similar local features extracted with each other as an associated feature point pair, in each selected image pair;
using associated the feature point pair as a node, and constructing a correspondence graph in which nodes corresponding to feature point pairs that are geometrically consistent are connected to each other with an edge;
extracting a cluster of a node set corresponding to a feature point pair set that configures a same common pattern, from the constructed correspondence graph; and
extracting, as the common pattern, a region obtained by integrating regions on the images, the regions corresponding to the extracted cluster, based on a degree of spatial overlapping between the regions.

3. The object detection device according to claim 2, wherein the constructing correspondence graph includes determining whether the feature point pairs are geometrically consistent is, using the local features of the feature points included in the associated feature point pair.

4. The object detection device according to claim 2, wherein extracting the cluster includes extracting a cluster in which feature point pairs corresponding to all nodes included in the cluster are not configured by a common feature point.

5. The object detection device according to claim 1, wherein detecting the region includes:
using each extracted common pattern extracted as a node, connecting, with an edge, nodes corresponding to a common pattern that is common within an image and between images included in the image set, and constructing a common pattern graph in which identification information regarding an image from which the common pattern is extracted is given to a corresponding node;
selecting, as an omnipresent common pattern, a common pattern corresponding to a path with a high degree of coverage of a set of the identification information regarding the image given to nodes included in the path, relative to a set of identification information regarding all images included in the image set, of paths included in the constructed common pattern graph; and
detecting, as a region indicating the object to be detected, a region obtained by integrating omnipresent common patterns selected by within each image based on at least one of commonality of paths corresponding to the omnipresent common patterns and a degree of spatial overlapping of the omnipresent common patterns in the image.

6. The object detection device according to claim 5, wherein detecting the region further includes correcting a boundary of a region indicating the omnipresent common pattern, based on information regarding pixels surrounding the region indicating the omnipresent common pattern.

7. An object detection method comprising:
by a computer,
extracting a local feature of a feature point from each image included in an input image set;
extracting, from each image pair selected from images included in the image set, a common pattern configured by a set of feature point pairs that have similar local features extracted in images configuring the image pair, the set of feature point pairs being geometrically similar to each other; and
detecting, as a region indicating an object to be detected in each image included in the image set, a region that is based on a common pattern that is omnipresent in the image set, among extracted common patterns.

8. A non-transitory computer readable medium storing a program executable by a computer to perform a process for object detection processing, the process comprising:
extracting a local feature of a feature point from each image included in an input image set;
extracting, from each image pair selected from images included in the image set, a common pattern configured by a set of feature point pairs that have similar local features extracted in images configuring the image pair, the set of feature point pairs being geometrically similar to each other; and
detecting, as a region indicating an object to be detected in each image included in the image set, a region that is based on a common pattern that is omnipresent in the image set, among extracted common patterns.

* * * * *